United States Patent [19]

Piske

[11] Patent Number: 5,371,951
[45] Date of Patent: Dec. 13, 1994

[54] TWO-AXIS INCLINOMETER

[75] Inventor: Wilfried Piske, Heerbrugg, Switzerland

[73] Assignee: Leica Heerbrugg AG, Heerbrugg, Switzerland

[21] Appl. No.: 862,891

[22] Filed: Apr. 6, 1992

[30] Foreign Application Priority Data

Apr. 4, 1991 [DE] Germany .............................. 4110858

[51] Int. Cl.⁵ ................................................ G01C 9/06
[52] U.S. Cl. ........................................ 33/366; 33/377; 356/150; 356/249
[58] Field of Search ................ 33/366, 377, 297, 1 L, 33/1 N, 283, 290, 281, 276, 277; 356/138, 149, 150, 249, 140, 144, 146; 359/665, 832

[56] References Cited

U.S. PATENT DOCUMENTS

| 3,655,274 | 4/1972 | Craig | 356/249 |
|---|---|---|---|
| 3,684,381 | 8/1972 | Zoot | 356/249 |
| 3,910,704 | 10/1975 | Richarme | 356/249 |
| 4,136,955 | 1/1979 | Aeschlimann et al. | 33/366 |
| 4,307,516 | 12/1981 | Walker | 33/366 |
| 4,332,090 | 6/1982 | Bailey et al. | 33/366 |
| 4,721,386 | 1/1988 | Collyer | 356/150 |
| 4,947,692 | 8/1990 | Koppel | 73/786 |
| 4,988,193 | 1/1991 | Cain et al. | 33/283 |
| 4,993,162 | 2/1991 | Scholian | 33/366 |
| 5,035,503 | 7/1991 | Sadeh et al. | 356/150 |
| 5,046,843 | 9/1991 | Keren | 356/150 |

FOREIGN PATENT DOCUMENTS

| 0161207 | 11/1985 | European Pat. Off. . |  |
|---|---|---|---|
| 0335117 | 10/1989 | European Pat. Off. . |  |
| 1162059 | 9/1958 | France | 356/249 |
| 3634244 | 4/1988 | Germany . |  |
| 56-198800 | 6/1983 | Japan . |  |
| 507506 | 6/1971 | Switzerland . |  |
| 2113383 | 8/1983 | United Kingdom | 33/366 |
| 1194125 | 9/1986 | U.S.S.R. | 33/366 |
| 1435941 | 11/1988 | U.S.S.R. | 33/366 |
| 1508096 | 9/1989 | U.S.S.R. | 33/366 |

OTHER PUBLICATIONS

"Micrometertheodolite Wild T1", Prospectus of the WILD Co., pp. 1–16. No date.

Primary Examiner—Thomas B. Will
Attorney, Agent, or Firm—Foley & Lardner

[57] ABSTRACT

A two-axis inclinometer having an inclination-sensitive ray-deflecting device is described, via which a geometrical figure having at least one angle is projected onto a linear array. In addition to providing high resolution, a large measurement range is also opened up by the special arrangement and configuration of the geometrical figure. X-, Y- and overlapping inclinations can be determined simultaneously using the described inclinometer.

5 Claims, 5 Drawing Sheets

TWO-AXIS INCLINOMETER

BACKGROUND OF THE INVENTION

The invention relates to a two-axis inclinometer for measuring inclinations or changes in inclination in two mutually perpendicular directions.

Two-axis inclinometers are used, for example, in geodesy for leveling geodetic measuring instruments. In such inclinometers, an element is provided which changes its position as a function of gravity. A measuring mark is projected above the element onto a positionally stable receiver. A positional variation arising here with respect to a previously adjusted zero point is a measure of the inclination of the instrument.

Such an inclinometer is known from EP 0 161 207 B1. Using slit illumination, a light bundle is projected via a mirror onto a combined glass-liquid prism. The prism has a container filled with silicone oil, the inclination being determined via a reflection at the liquid horizon and projection of the ray onto a light-sensitive array. It is possible to determine only a uniaxial direction of inclination in conjunction with a restricted measurement range using the slit illumination described in the above reference. However, biaxial inclination measurements are necessary with geodetic instruments, in particular.

SUMMARY OF THE INVENTION

It is an object of the present invention to develop an inclinometer so as to permit biaxial measurements in conjunction with high measurement accuracy and a wide measurement range.

This object is achieved using an inclinometer for measuring inclinations or changes in inclination in two mutually perpendicular directions. This inclinometer is constructed from a carrier having a geometrical figure, a light source which illuminates the carrier, a linear sensor array, an inclination-sensitive ray-deflecting device and means for projecting the geometrical figure onto the linear sensor array via the inclination-sensitive ray-deflecting device, wherein the geometrical figure has at least two projected portions which intersect the array.

Other objects, features, and advantages of the invention will be apparent from the following description of the preferred embodiments.

BRIEF DESCRIPTION OF THE DRAWINGS

The invention is represented in exemplary embodiments and explained in further detail with the aid of accompanying drawings, wherein.

DETAILED DESCRIPTION OF THE PREFERRED EMBODIMENTS

Figure 1:
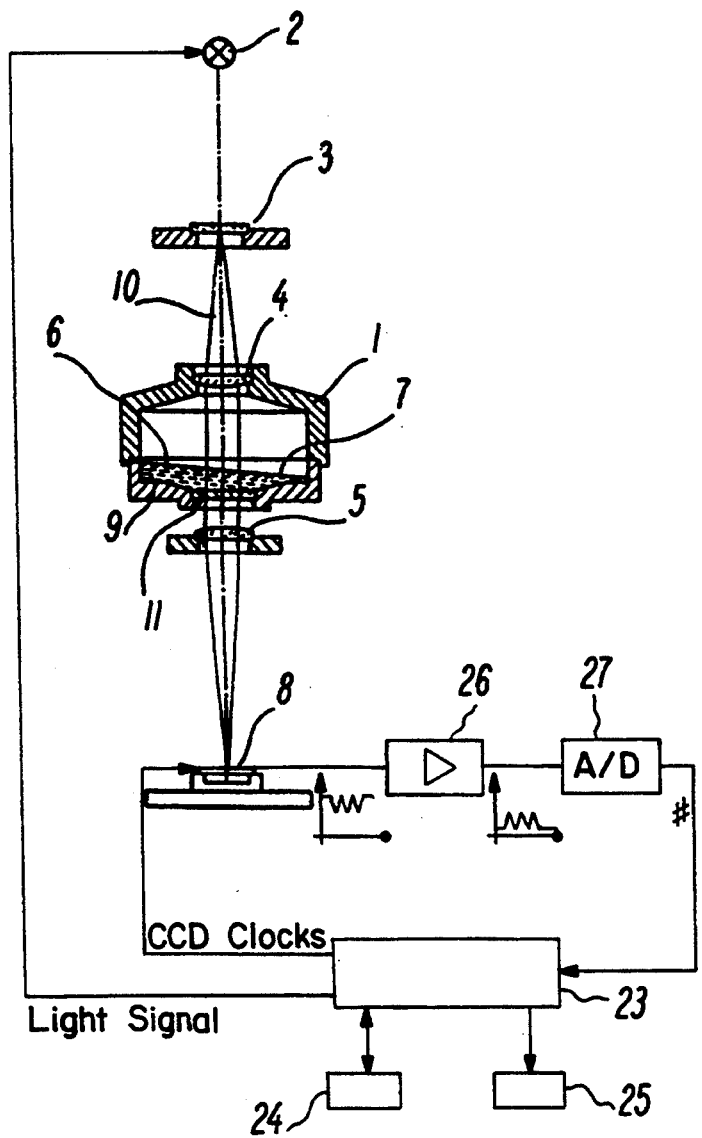
FIG. 1 shows a measuring arrangement having a liquid prism in the transmitted light.

FIG. 1 shows an arrangement for a two-axis inclinometer having a light source 2 from which an illuminating ray bundle 10 is projected via a carrier 3 and through a liquid prism 1. A lens system 4 and 5 is arranged in the ray path. The liquid prism 1 has a liquid 6, which preferably consists of transparent silicone oil, in a container 7. The container 7 is closed by a transparent end plate 11. A pattern, such as pattern 12, 17 or 18, shown in FIGS. 2, 8 and 7 respectively, provided on the carrier 3 is projected by the two lenses 4, 5 onto a linear sensor array 8 via the liquid 6. The illuminating ray bundle 10 is collimated in the region of the liquid 6. The arrangement described here can be located both in a dedicated housing and as a component in a geodetic measuring instrument.

In this first embodiment, a deflection of the illuminating ray bundle 10 is performed in the X- and Y-direction by refraction at the inclined liquid horizon 9, the liquid 6 behaving like an optical wedge.

Figure 2:
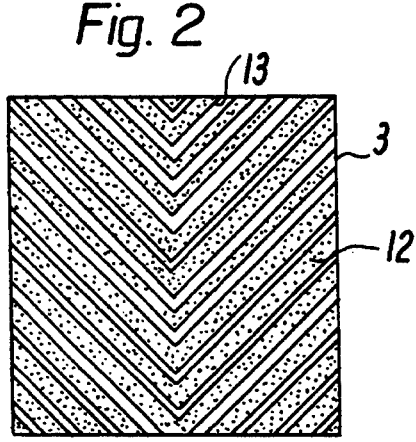
FIG. 2 shows a carrier having a geometrical figure constructed as a herringbone pattern.

FIG. 2 shows the carrier 3 having arranged thereon a herringbone pattern 12 made of individual angles 13 which are arranged in differing line widths and with irregular spacing from one another on the carrier 3. A larger measurement range for the inclination measurement is achieved by means of this coded arrangement. The evaluation of a biaxial inclination measurement with a 90° angle is explained in more detail with the aid of FIG. 3.

Figure 3:
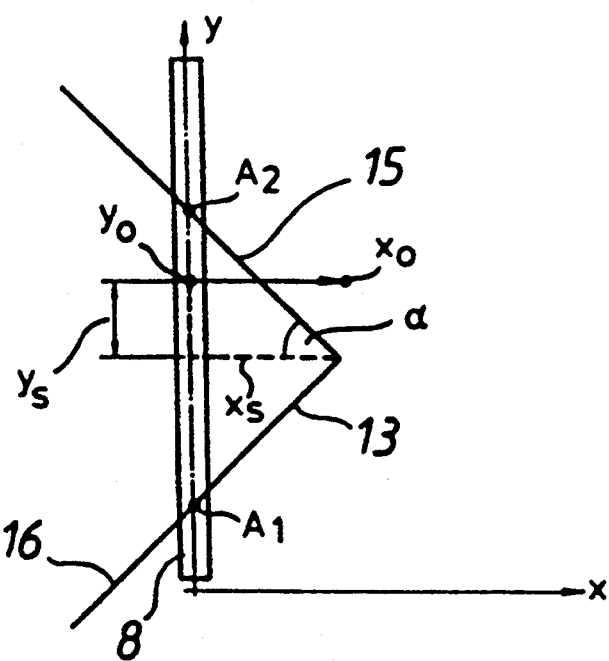
FIG. 3 shows a linear array having an angle of the geometrical figure projected onto it.

FIG. 3 shows the linear sensor array 8 having an individual angle 13 of the geometrical figure projected onto it. The two legs 15, 16 of the angle 13 intersect CCD 8 at points $A_1$, $A_2$ respectively.

The apex of the angle 13 was projected onto the coordinates $X_0$ and $Y_0$ and an X—Y-coordinate system was fixed computationally with this point as the normal position. This point thus represents the condition of no inclination occurring in the X and Y directions.

An X—Y inclination is determined from the positional deviation of the apex of the angle 13 using the following specified formulae:

$$Y_S = \frac{A_1 + A_2}{2} \tag{1}$$

$$X_S = (A_2 - Y_S) * ctg\,\alpha = \frac{A_2 - A_1}{2} * ctg\,\alpha \tag{2}$$

In order to evaluate an inclination in the Y-direction, the angle 13 is displaced on the array 8 along the Y-axis, and thus the apex of the angle 13 is displaced parallel to the array 8. This displacement is determined from the magnitude of the distance $Y_S - Y_0$.

In order to evaluate an inclination in the X-direction the angle 13 is displaced along the X-axis, and thus the apex of the angle 13 is displaced perpendicular to the array 8. This displacement is determined by the magnitude of the distance $X_S - X_0$.

In the case of an overlapping movement, that is to say an inclination in both the X- and the Y-direction, the magnitudes of the two displacements resulting therefrom on the array 8 can be determined separately.

In order to simplify the calculation, the angle 13 can be constructed to be 90° (ctg 45°=1). The measuring sensitivity can, however, also be varied by the choice of angle. It becomes clear from the above-mentioned formulae that the sensitivity with respect to a displacement in the x-direction is higher at an angle of $\alpha>45°$ than at $\alpha<45°$. The measurement range is extended by the use of a geometrical figure such as has already been described in relation to FIG. 2, for example, and it is possible to carry out a plurality of measurements simultaneously for the purpose of error compensation. Depending on the differing line widths and/or the differing spacing of individual angles 13 with respect to one another, each individual angle 13 can be uniquely detected with the aid of this coding and evaluated in a microprocessor 23 shown in FIG. 1.

This microprocessor 23 controls the reading of the inclination sensor 8. Microprocessor 23 outputs signals controlling the strength and duration of the illumination provided by light source 2. Microprocessor 23 also outputs a clock signal to array 8. While array 8 is being illuminated, the corresponding value sensed on a pixel is output as an electrical signal during the clock timing signal. The signal is then amplified by amplifier 26 and converted to a digital signal by A/D converter 27. This digital signal is read in by microprocessor 23 and is temporarily stored in RAM 24 for the further computation of the entire pixel array.

For the evaluation, the positions of the peaks in the pixel image must first be determined. The average center of gravity of the peaks is computed with a calibration constant which is specific for the apparatus and takes into account the index of the liquid 6. The value of the reference position is compared to this result in order to obtain the absolute inclination as an angular value. This value is then displayed on display unit 25.

Figure 4:
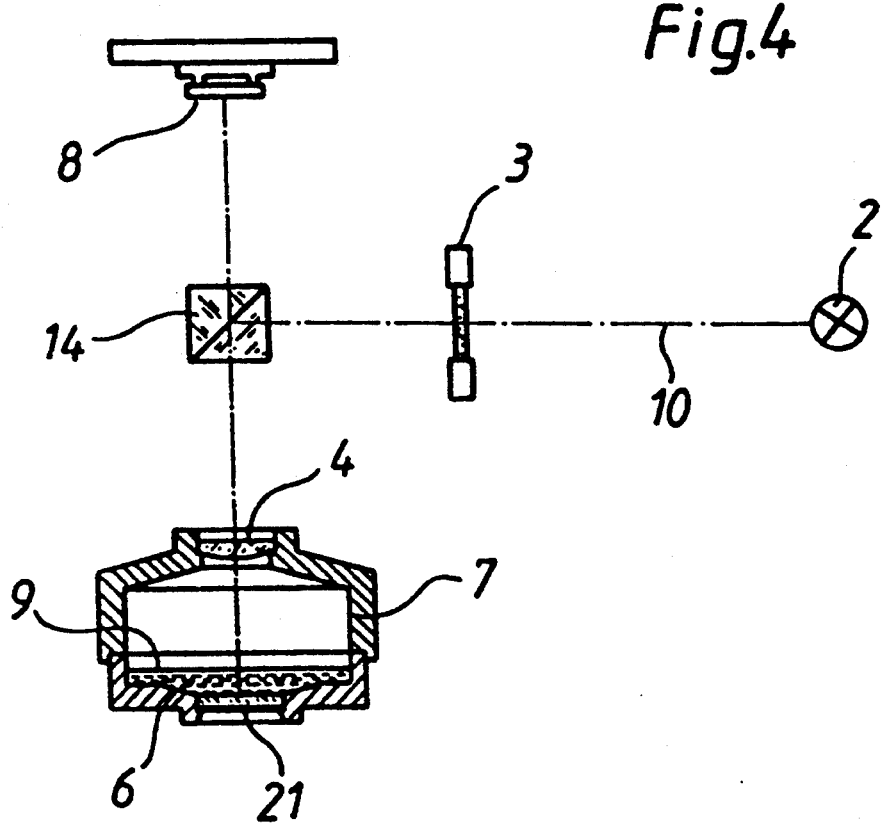
FIG. 4 shows a measuring arrangement having a liquid prism and beam splitter.

FIG. 4 shows a further exemplary embodiment having a splitter prism 14. The ray bundle 10 is deflected via this splitter prism 14 and refracted at the liquid horizon 9. A reflection of the image with the geometrical figure is performed at the mirror 21. The reflected image is projected to the array 8 via the prism 14.

Figure 5:
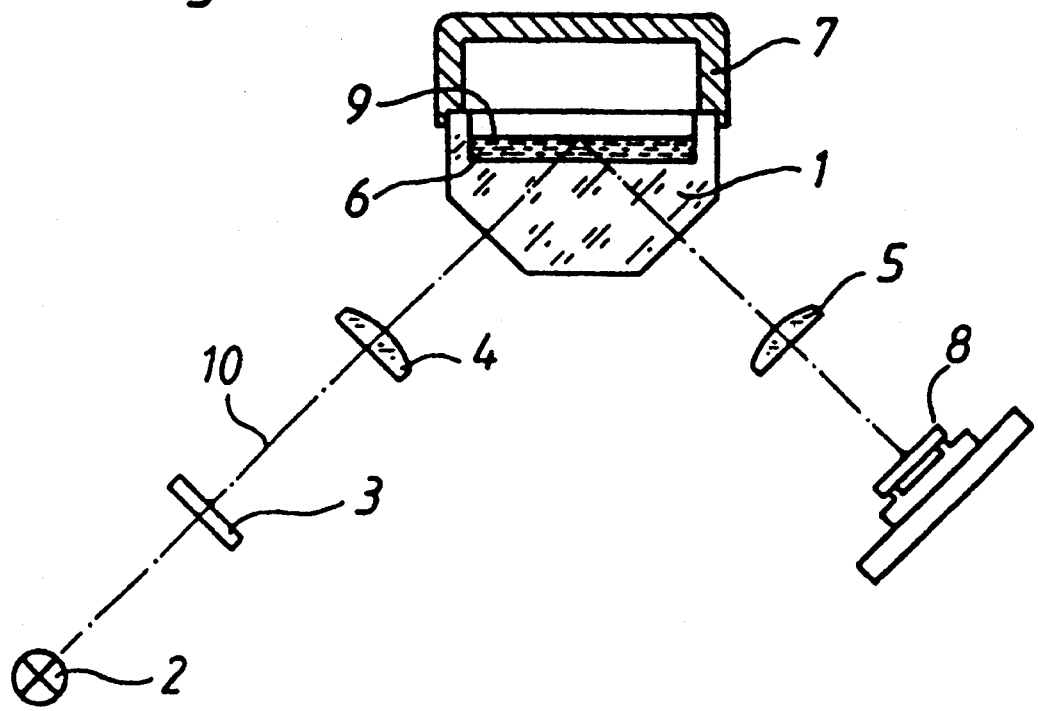
FIG. 5 shows a measuring arrangement having a liquid prism and total reflection at the liquid horizon.

FIG. 5 represents an exemplary embodiment having a combined glass-liquid prism 1 which is distinguished by the fact that in conjunction with oblique illumination, the incident illuminating ray bundle 10 is reflected at the liquid horizon 9. As a result, it is possible to achieve a high deflection of the illuminating ray bundle 10 even in the case of small X—Y inclinations.

Figure 6:
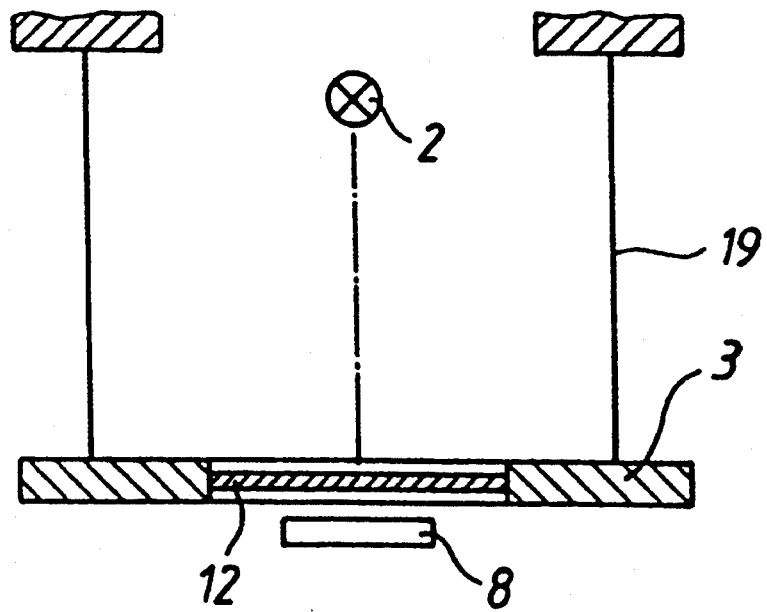
FIG. 6 shows a measuring arrangement having a filament pendulum.

FIG. 6 shows an exemplary embodiment of the arrangement having a filament pendulum 19 on which the carrier 3 having the geometrical structure is arranged. The carrier 3 is illuminated by a light source 2, and the image is projected onto the linear array 8 arranged below the carrier 3. If the distance between the carrier 3 and the sensor array 8 is chosen as small as possible, the use of additional lenses can be eliminated.

Figure 7:
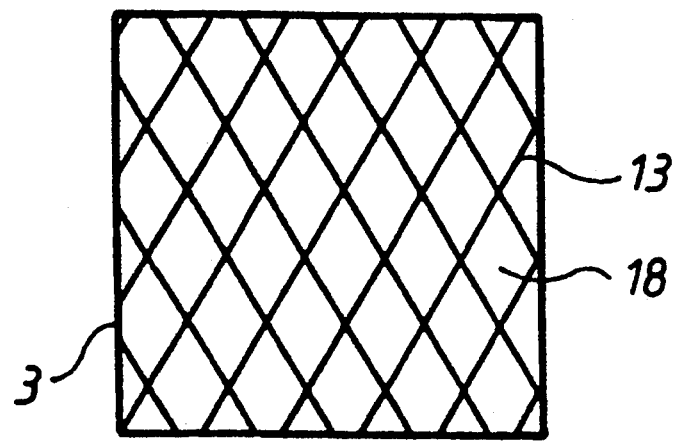
FIG. 7 shows a carrier having a geometrical figure constructed as a rhomboidal pattern.

FIG. 7 shows the carrier 3 having arranged thereon a rhomboidal pattern 18 made of individual angles 13. In a manner analogous to the exemplary embodiment of FIG. 2, it is also possible here for the individual angles 13 to be designed with differing line widths.

Figure 8:
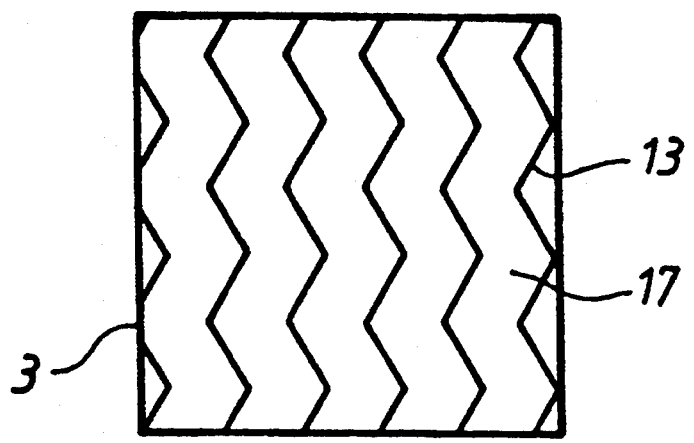
FIG. 8 shows a carrier having a geometrical figure constructed as a meandering pattern.

Represented in FIG. 8 is the carrier 3 having arranged thereon a meandering pattern 17 made of individual angles 13 arranged in a row. In this embodiment, the individual angles 13 can be provided in differing line widths and/or at differing distances from one another on the carrier 3.

Figure 9:
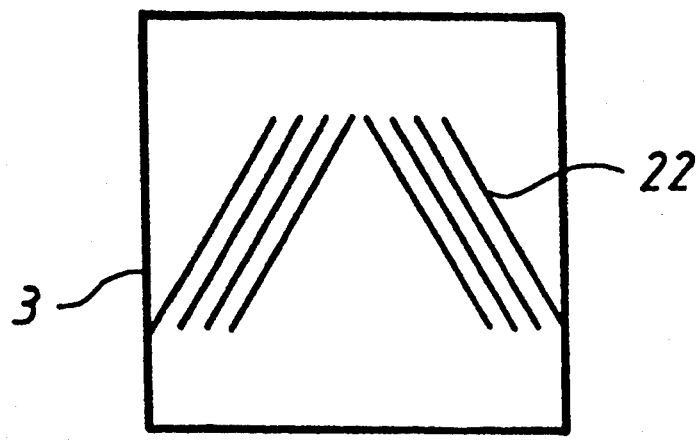
FIG. 9 shows a carrier having a geometrical figure composed of interrupted individual angles.

FIG. 9 shows a geometrical figure having interrupted individual angles. These angles 22 do not restrict the functioning of the geometrical figure, but limit only the maximum measurement range in the X- or Y-direction.

Figure 10:
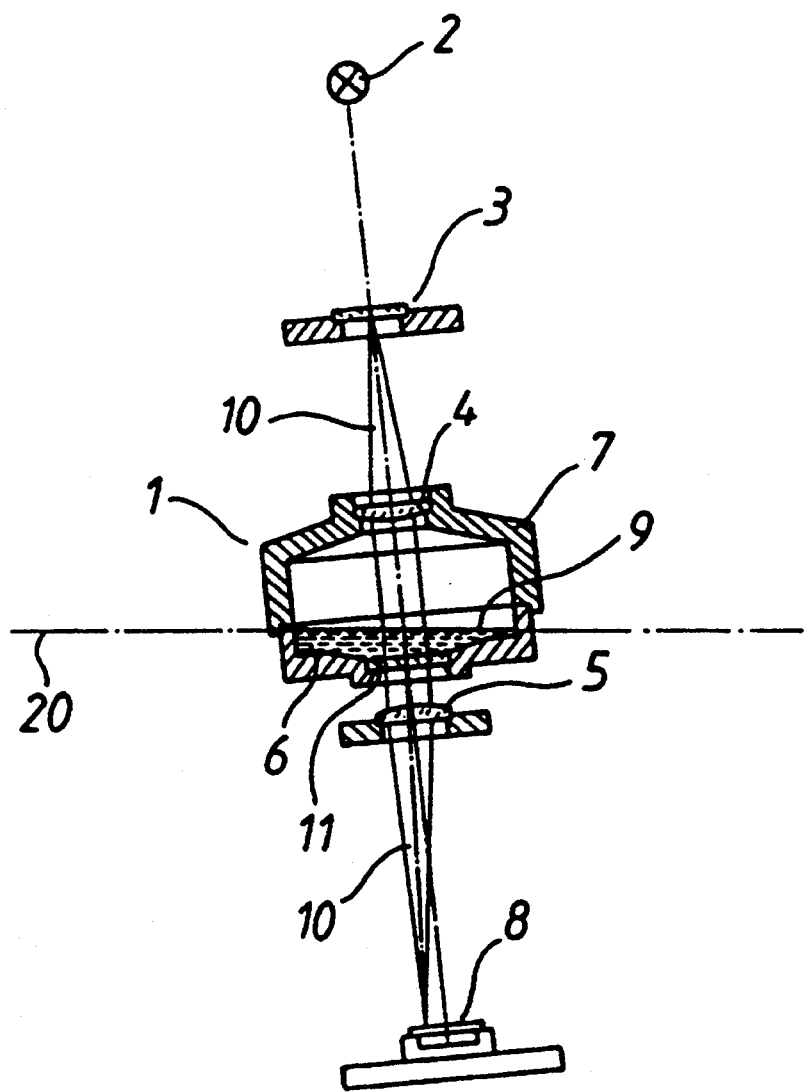
FIG. 10 shows an inclined measuring arrangement having a liquid prism in the transmitted light.

FIG. 10 shows, in a manner analogous to FIG. 1, an inclined measuring arrangement illuminated by transmitted light. The liquid horizon 9 is aligned in this case under the effect of gravity with respect to the actual horizon 20. This liquid horizon 9, together with the end glass 11, forms an optical wedge at which the collimated illuminating ray bundle 10 is refracted. The projection of the geometrical figure onto the linear sensor array 8 is performed via the lens 5.

The invention is not restricted to geodetic measuring instruments, but can be used as a separate instrument or else in combination with another instrument wherever X—Y inclinations are to be detected.

Other designs within the spirit and scope of the invention will be apparent to those skilled in the field after receiving the above teachings. The invention, therefore, is defined with respect to the following claims.

What is claimed is:

1. An inclinometer for measuring inclinations or changes in inclination in two mutually perpendicular directions, comprising:
   a geometrical figure arranged on a carrier;
   a linear sensor array;
   an inclination-sensitive ray-deflecting device, said inclination-sensitive ray-deflecting device being a liquid prism; and
   a light source which illuminates said carrier for projecting said geometrical figure onto said linear sensor array via said inclination-sensitive ray-deflecting device, wherein said geometrical figure includes a plurality of lines having differing line thickness forming individual angles arranged one behind another to form a herringbone pattern, said geometrical figure being arranged with respect to said light source and said sensor array such that both sides of at least one of said plurality of angles intersects said array at two points.

2. An inclinometer as recited in claim 1, wherein said liquid prism has transparent silicone oil as its liquid.

3. An inclinometer as recited in claim 1, wherein said carrier is transilluminated by the light source for projecting the geometrical figure onto the array.

4. An inclinometer as recited in claim 1, wherein said geometrical figure is projected by a total reflection at a horizon of a liquid in said liquid prism.

5. An inclinometer as recited in claim 1, further comprising:
   means for reading out signals from said array; and
   a processing unit receiving said signals and outputting an absolute inclination.

* * * * *